US005808630A

United States Patent [19]

Pannell

[11] Patent Number: 5,808,630

[45] Date of Patent: Sep. 15, 1998

[54] SPLIT VIDEO ARCHITECTURE FOR PERSONAL COMPUTERS

[75] Inventor: Donald Robert Pannell, Cupertino, Calif.

[73] Assignee: Sierra Semiconductor Corporation, San Jose, Calif.

[21] Appl. No.: 552,771

[22] Filed: Nov. 3, 1995

[51] Int. Cl.[6] .......... G06F 12/00

[52] U.S. Cl. .......... 345/514; 345/509; 345/439; 345/153; 345/154

[58] Field of Search .......... 395/509, 501, 395/139, 135, 502, 508, 521, 514; 345/153, 154, 155, 185, 186, 189, 196, 202, 509, 514, 501, 439, 435, 502, 508, 521

[56] References Cited

U.S. PATENT DOCUMENTS

| | | | |
|---|---|---|---|
| 5,097,257 | 3/1992 | Clough et al. | 345/196 |
| 5,257,348 | 10/1993 | Roskowski et al. | 395/509 |
| 5,274,753 | 12/1993 | Roskowski | 395/509 |
| 5,406,306 | 4/1995 | Siann et al. | 345/115 |
| 5,506,604 | 4/1996 | Nally et al. | 345/153 |
| 5,559,954 | 9/1996 | Sakoda et al. | 345/153 |

*Primary Examiner*—Kee M. Tung
*Attorney, Agent, or Firm*—Burns, Doane, Swecker & Mathis, LLP

[57] ABSTRACT

A split video architecture in accordance with the present invention merges or composites the video data into a common frame buffer with the desktop data. For example, pixels of a first format (e.g., RGB) can be sent directly to the monitor. Pixels of a second format (e.g., YUV) can be filtered and color space converted from the second format to the first format (e.g., YUV to RGB) in the backend, and then the converted values can be sent to the monitor. To accommodate such operation, exemplary embodiments are configured to inform the backend which pixels are of the first format (e.g., RGB) and which are of the second format (e.g., YUV).

2 Claims, 5 Drawing Sheets

SPLIT VIDEO ARCHITECTURE FOR PERSONAL COMPUTERS

BACKGROUND OF THE INVENTION

1. Field of the Invention

The present invention relates generally to video signal processing, and more particularly, to a video architecture for use with graphics frame buffers and monitors.

2. Description of Related Art

With the proliferation of computers into everyday life, it has become increasingly important for computer systems to be adaptive to new technologies and be cost effective. A continuing problem in the field of computer graphics display is how to combine video with graphics data without severe degradation of the video quality.

A frame buffer is a portion of memory holding a frame of data. Graphics or desktop data is stored in the frame buffer so that it can be reread and redisplayed many times a second in order to refresh a monitor's display. Graphics frame buffers typically contain data in an RGB (red green blue) data format as RGB is the native data format of monitors. As a result, graphics software has been developed around this model and therefore only works with RGB data in the frame buffer.

Because graphics data is stored in an RGB format, it is difficult to display live motion video with graphics data in a window or full screen of an RGB monitor. Video data typically has a native format of YUV (YCrCb), also known as "true color" format, that does not directly correlate to an RGB format. Therefore, it is difficult to combine the two data formats for display on a monitor. The problem of combining these two data formats has been addressed in the past by separating the RGB and YUV data in either separate memory buffers or in separate areas of a shared frame buffer.

Generally speaking, two different architectures have been used in industry to address this problem. The first architecture is known as a "backend" or overlay video architecture, such as that shown in FIG. 2. In this architecture, a shared frame buffer 110 stores graphics data 115 in one portion of the buffer and YUV video data 117 from a host/video input 102 in a second offscreen memory. The YUV video data 117 is read out of the offscreen memory on a separate video line 125 and is then color space converted, scaled and filtered in block 130 into an RGB format. The graphics data and converted YUV data are combined for display through use of the MUX 140. A chroma key 135 is used to clip the necessary graphics data allowing the video data to overlay or appear "in front of" the graphics data. In a backend architecture, all video acceleration functions are done after the frame buffer.

The backend architecture allows full color video and complete chroma key support for clipping. However, the backend architecture has the disadvantage of only supporting one video window for display on the monitor at a time. A second drawback is that it requires a large offscreen buffer for the video data and cannot support video in all graphics modes. These extra memory requirements cannot be supported by all systems. Furthermore, the converting, scaling and filtering must be done at the maximum pixel speed, which generally limits the maximum pixel clock rate.

U.S. Pat. No. 5,406,306 (Siann et al.) discloses a display memory which uses a conventional backend video architecture. The system disclosed in this patent suffers performance limitations and requires a relatively large memory.

A second architecture for addressing the problem of combined display of RGB and video data has been to convert the YUV data to RGB data and store the RGB video data composited alongside the graphics data in a shared frame buffer. This is known as a frontend architecture, such as that illustrated in FIG. 3. In this architecture, the video input 102 is converted, scaled, filtered, dithered and clipped in block 108 into RGB video data before it is stored in the shared frame buffer 110. In this architecture, all video acceleration functions are done before the frame buffer. The advantage of this architecture is that it supports multiple video windows and uses a standard graphics backend. However, a frontend system produces bad video quality in 8-bit desktops and poor video quality in 16-bit desktops. In 8-bit desktops, an 8-bit value is typically used as an entry to a look-up table which outputs an RGB value. Because an 8-bit mode only affords 256 different entries in the LUT, RGB cannot support the full range of colors of the video format. The hardware therefore has to mix or dither the available colors to try to obtain the appearance of full color. One technique to mitigate the color quality problem of dithering is to use two look-up tables in the backend, with one LUT for 8-bit desktop data and one LUT for 8-bit encoded video data. Thus, 8-bit entries are used to address two different LUTs of data having a common RGB format. An off-screen memory is then used to indicate which pixels on the screen are associated with each of the two LUTs. However, such a configuration requires the use of two very large and expensive LUTs.

In 16-bit desktops, poor video quality results due to low frequency color changes. These deficiencies are the result of the frontend requirement that YUV be changed to RGB before storing it in the frame buffer.

Thus, state of the art video architectures have all of the video functions in one place; that is, either all in the frontend or all in the backend. While these systems work, each has severe limitations in video quality, the maximum pixel clock rate, the number of video windows supported, and/or the quality of the scaled image (usually limited to one window and 80 MHz with vertical replication in backend designs). This is especially true for 8-bit desktop systems.

It is therefore an object of this invention to support full color video in all graphics modes without the need for extra memory over the industry standard required to support a given graphics mode. In addition, it is another object to support multiple video windows in a graphics display without picture or color degradation. It is a further object to provide the above features at a reduced cost while also reducing the amount of on-chip buffer memory necessary.

SUMMARY OF THE INVENTION

Exemplary embodiments of the present invention are directed to overcoming the aforementioned drawbacks using a split video architecture. In accordance with exemplary embodiments, some video acceleration functions are performed before the frame buffer and some are performed after the frame buffer. A split video architecture in accordance with the present invention merges or composites the video data into a common frame buffer with the desktop data. For example, pixels of a first format (e.g., RGB for 16-bit and 24-bit desktops or, is 8-bit desktops, 8-bit addresses to a LUT that outputs RGB values) can be sent directly to the monitor. Pixels of a second format (e.g., YUV) can be filtered and color space converted from the second format to the first format (e.g., YUV to RGB) in the backend, and then the converted values can be sent to the monitor. To accommodate such operation, exemplary embodiments are configured to inform the backend which pixels are of the first format (e.g., RGB) and which are of the second format (e.g., YUV).

To distinguish between the exemplary YUV and RGB data, an offscreen tag map is used in accordance with exemplary embodiments to inform the backend which pixels need to be filtered/converted. The tag map can, for example, be a set number of bits per pixel that is stored in an offscreen buffer. The size of the tag map varies with screen resolution and the desired resolution of what pixels are desktop versus what pixels are video. The tag map is typically much smaller in size than the video input, making it possible to load the tag map for a given scan line during the horizontal blank. In addition, the tag map can provide information on where to clip the incoming video data.

Exemplary embodiments of the present invention can provide significant advantages by reducing memory requirements without sacrificing performance capabilities. In accordance with yet another advantageous feature of the present invention, a dynamic power saving scheme can be implemented in accordance with the split video architecture to reduce power consumption.

Generally speaking, exemplary embodiments relate to a method and apparatus for controlling the display of both graphics and video data comprising a graphics input for supplying graphics data in a first data format, a video input for supplying video data in a second data format, a memory for storing said graphics data in said first data format and for storing said video data in said second data format, and a tag map for identifying data output from said memory as graphics data of said first data format or as video data of said second data format.

BRIEF DESCRIPTION OF THE DRAWINGS

Features and advantages of the invention will be understood by reading the following description in conjunction with the drawings, in which like elements are labelled with like reference numerals, and in which.

DETAILED DESCRIPTION OF THE PREFERRED EMBODIMENTS

Figure 1:
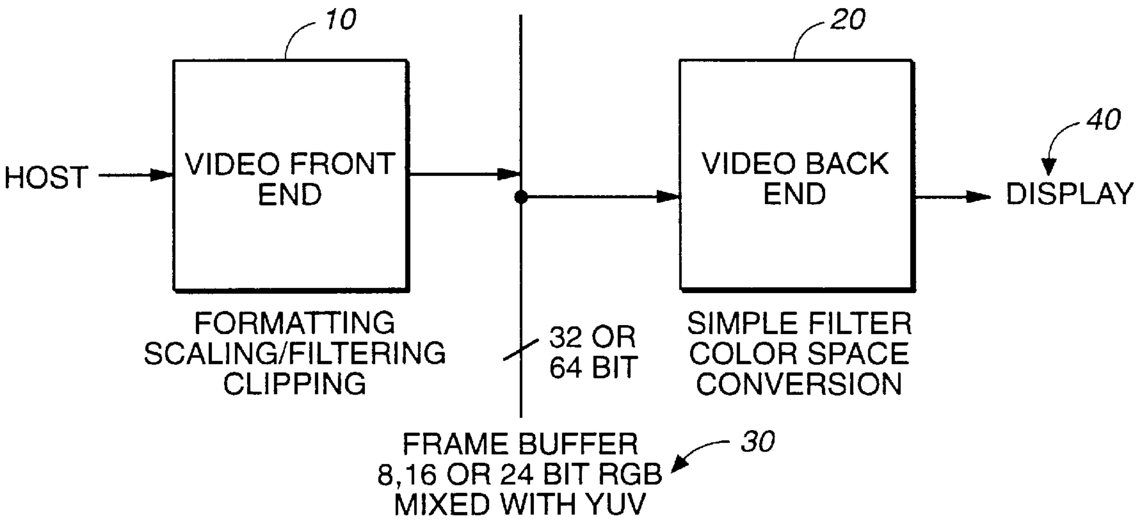
FIG. 1 is an exemplary embodiment of a split composite video block diagram in accordance with the present invention.

The present invention is directed to a split composite architecture and method for display of video and graphics data. In accordance with exemplary embodiments, some video functions are provided before the frame buffer memory (that is, the video frontend) and some video functions are provided after the frame buffer memory (that is, the video backend). Referring to FIG. 1, an exemplary video frontend 10 supports various video formats, scaling (both up and down), filtering (such as two dimensional interpolation), and clipping. While graphics data 101 is supplied via a first graphics input from a host computer in a first format (e.g., RGB format), the video data can be supplied from a second video input, and stored in a memory, represented as the shared frame buffer 30, in a second (e.g., YUV) format. The graphics data and the video data are thus stored in the frame buffer in a mixed and/or interleaved manner, with bytes of graphics data being randomly stored next to bytes of video data. The video backend 20 performs a simple filter function for 8-bit and 16-bit desktop modes and color space conversion of the video data at, for example, maximum pixel clock rates (such as 135 MHz or greater).

For purposes of the following discussion, the frame buffer will be used as a reference point. All functions performed before the frame buffer are, in accordance with exemplary embodiments, referred to herein as frontend functions and all functions performed after the frame buffer are referred to herein as backend functions.

Figure 4:
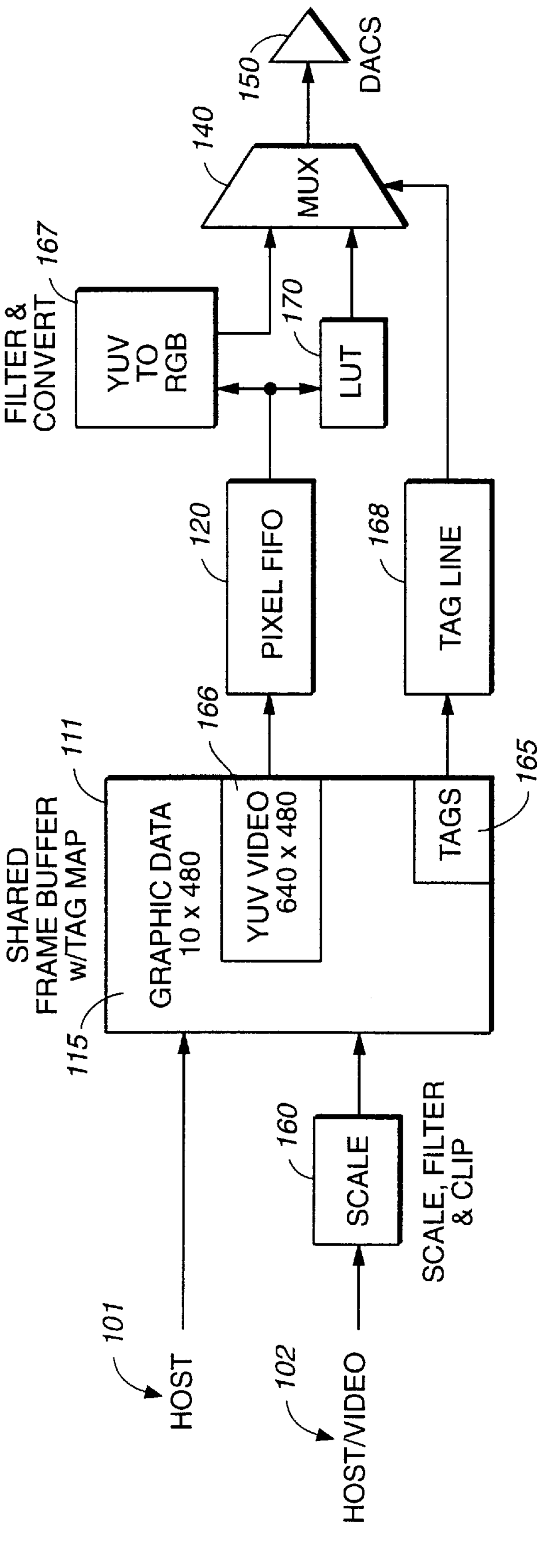
FIG. 4 illustrates an exemplary embodiment of split video architecture block diagram with shared frame buffer with tag maps.

Referring now to FIG. 4, a more detailed illustration of an exemplary split video architecture is shown. Host graphics data 101, in the first (e.g., RGB) format, is stored in the shared frame buffer 111. Video data is scaled, filtered, and clipped in block 160 and is also stored in the shared frame buffer. However, unlike typical frontend systems, the video data 166 is stored in the frame buffer 111 in its native (e.g., YUV) format.

The data output from the shared frame buffer is sent to a filter/converter 167 and a lookup table (LUT) 170. The LUT 170 is used in accordance with exemplary embodiments to enhance the graphics data stored in the second (e.g., RGB) format for display in any known fashion. For the exemplary embodiment illustrated, the filter/converter 167 converts the video data (e.g., YUV data) to the format used for the monitor (e.g., RGB format).

According to another aspect of the invention, a small offscreen map, or tag map, 165 is used to identify data output from the shared frame buffer as graphics data of the first data format or as video data of the second data format. Referring to the exemplary FIG. 4 embodiment, the information included in the tag map is used to clip the incoming video data and define data stored in and output from the frame buffer 111 as graphics/desktop data 115 of the first format or as video data 166 of the second format. The tag map 165 is used to supply information to a tag line buffer 168 for controlling the MUX 140, and to signal the MUX 140 if data output from the frame buffer is video data 166 or graphics data 115.

In an alternate embodiment the tag line can be used to dynamically manage the data flow to the LUT or filter converter depending on the kind of pixel data being sent through a pixel first-in first-out (FIFO) memory 120. For example, when integrating a video plus graphics subsystem onto a single integrated circuit, excess power consumption can result from the high speed and high integration of both video and graphics subsystems. However, in practice, many visual applications can be effectively achieved without simultaneously operating the video and graphics subsystems. As a result, even larger integration can be achieved to thereby reduce manufacturing costs and improve system performance. In addition, dynamic power saving can be achieved by exploiting exemplary implementations wherein the video and graphics subsystems do not require operation at the same time for visual applications. Applications that are suitable for using a dynamic power saving feature in accordance with exemplary embodiments involve both video and graphics pictures interleaving one another. In these applications, either the video path or the graphics path can be switched off while the other is operative using the tag bit, also referred to herein as a video alpha control bit.

More particularly, the video path includes the video backend filter and color space converter running at the pixel rate. The graphics path includes a color lookup table running at the pixel rate as well. The color space converter and the color lookup table typically consume approximately the same amount of power. For high speed operation, these components will consume large quantities of power, such that significant power consumption can be saved if one or the other of the color lookup table and color space converter are powered down using the video alpha control bit.

Figure 7:
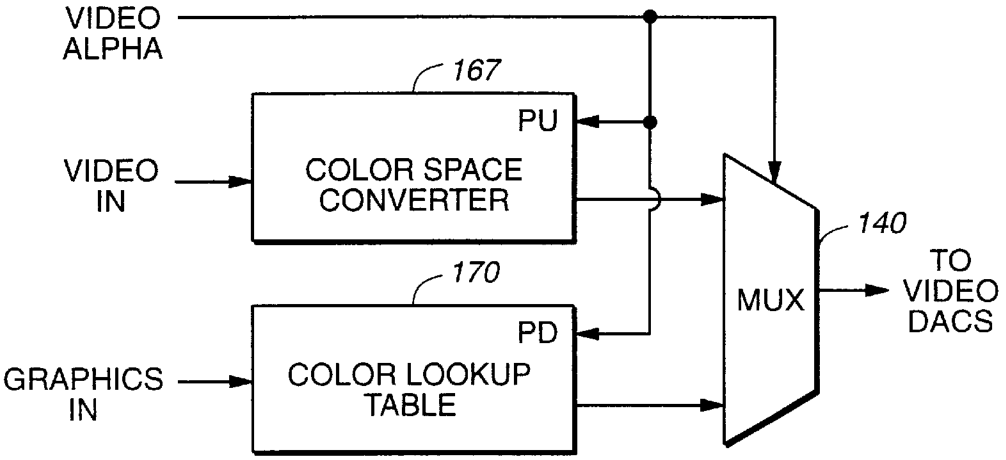
FIG. 7 illustrates an exemplary embodiment of a dynamic power saving scheme for a split video architecture.
Figure 2:
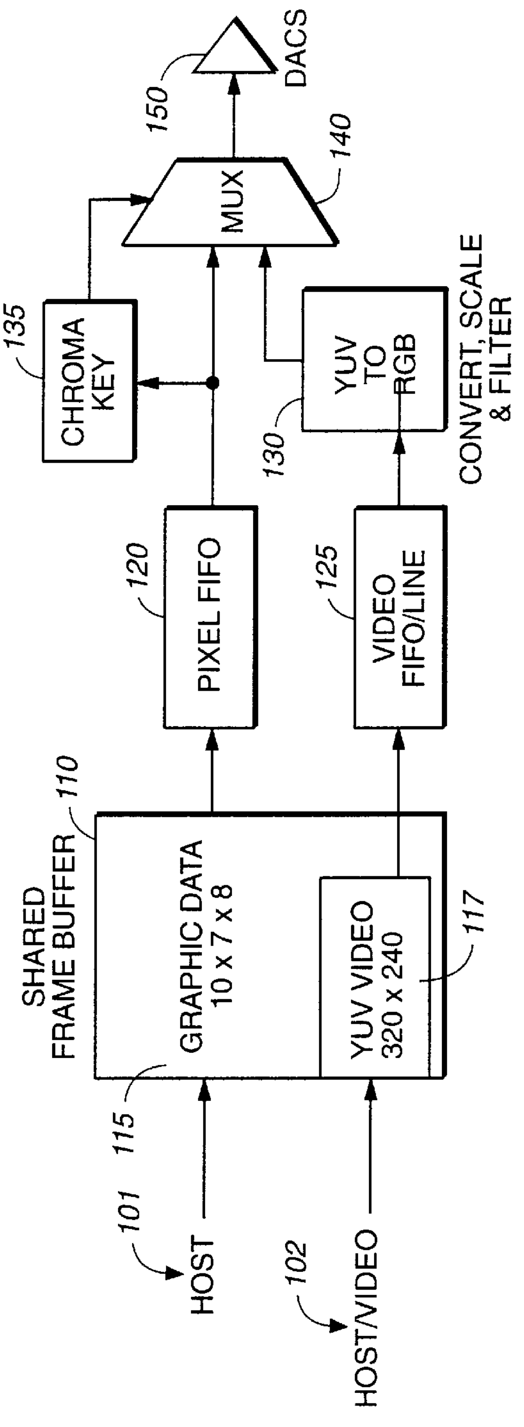
FIG. 2 (PRIOR ART)
FIG. 2 represents a conventional backend video architecture block diagram.
Figure 3:
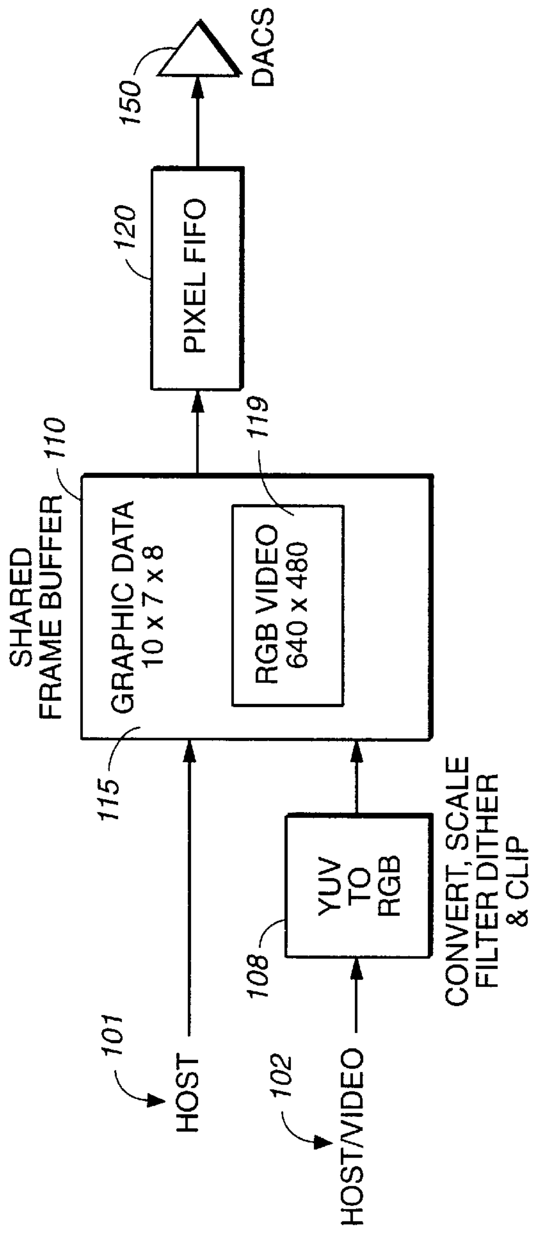
FIG. 3 (PRIOR ART)
FIG. 3 illustrates a conventional frontend video architecture.

To illustrate a dynamic power saving feature, reference is made to FIG. 7, wherein the video path and the graphics path of FIG. 4 have been multiplexed digitally using a 2:1 multiplexer controlled by the video alpha color bit. The video alpha control bit is also used to control the power up of the color space converter, and the power down of the color lookup table. In accordance with exemplary embodiments, when the video alpha control bit is active (e.g., active logic high), the color space converter is powered up and the color lookup table is powered down. Consequently, a video pixel is displayed on the monitor. To the contrary, when the video alpha control bit is deactivated (e.g., inactive logic low), the color space converter is powered down and the color lookup table is powered up. Consequently, a graphics pixel is displayed on the monitor.

Those skilled in the art will appreciate that the video alpha control bit can be changed at the pixel rate. Thus, the pixel stream supplied to the monitor can, for example, be switched back and forth between video pixels and graphics pixels on a pixel-by-pixel basis.

The Video Backend

Figure 5:
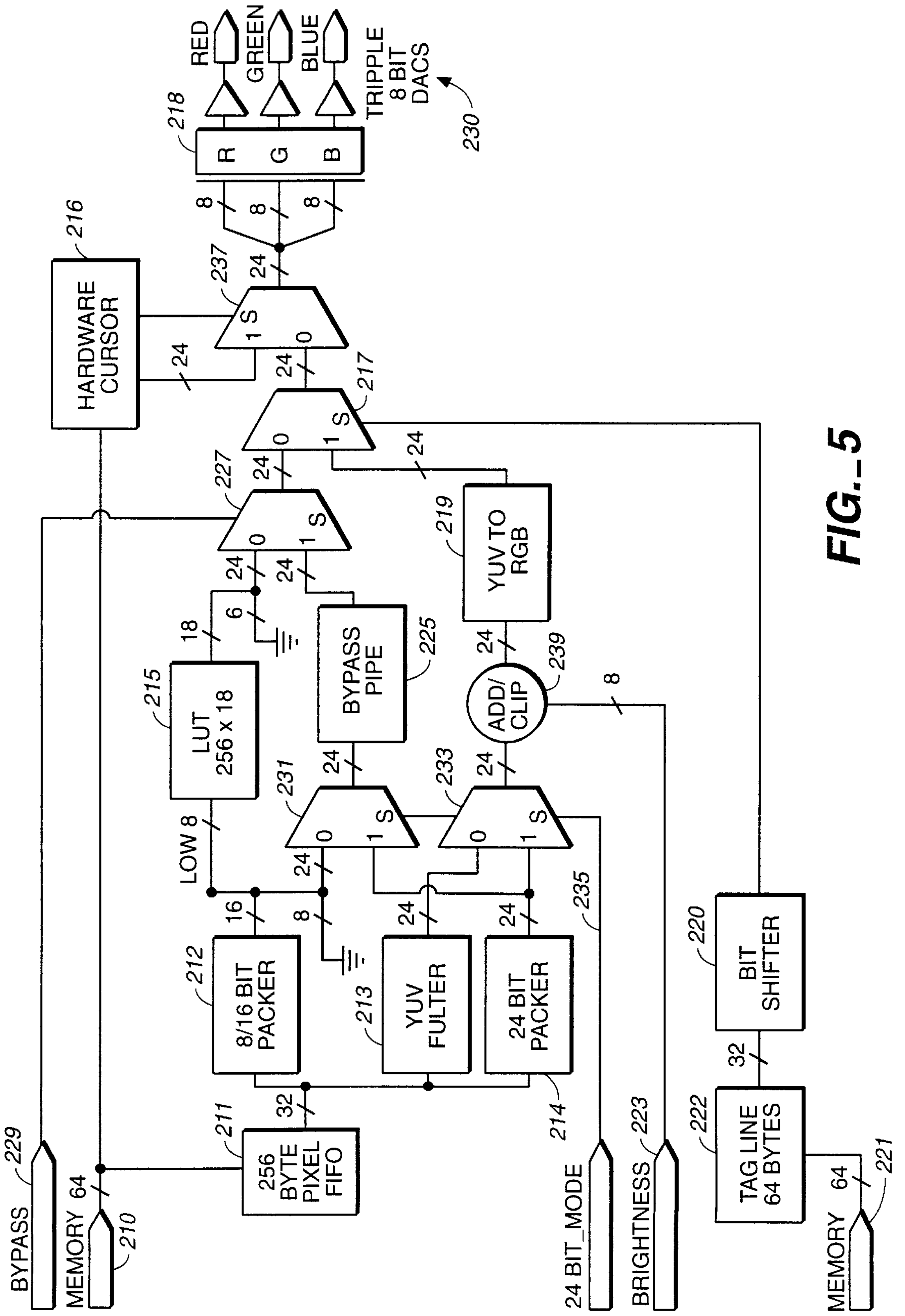
FIG. 5 illustrates an exemplary backend architecture according to one embodiment of the invention.

Referring now to FIG. 5, a more detailed illustration of an exemplary backend architecture of the FIG. 4 split video architecture is shown. The video backend fetches data stored in the frame buffer and sends it to the display at a given refresh rate. For example, the video backend can overlay a hardware cursor 216 on top of any other data via a multiplexer 237 which is controlled by the hardware cursor logic, and convert 8- or 16-bit RGB data into a 24-bit format. The converted data can be input to triple 8-bit digital-to-analog converters (DACs) 230 for final display on the monitor. In an 8-bit RGB mode, an 8/16-bit packer 212 is used in conjunction with a standard VGA 256×18 LUT 215 of the exemplary FIG. 5 embodiment to expand the color range. In a 16-bit RGB mode, the desktop data can be passed through the 8/16-bit packer 212, and bypasses the LUT 215 via a bypass pipe 225. In a 24-bit mode, the RGB desktop data can be passed through a 24-bit packer 214 and the bypass pipe 225. The output from either the LUT 215 or the bypass pipe 225 is selected via a multiplexer 227 and a bypass mode control signal 229 (e.g., the bypass mode control signal is active in 16-bit and 24-bit modes to select the output of the bypass pipe 225). These functions are standard in typical VGA devices.

Further, in the exemplary FIG. 5 embodiment, all data is supplied from the 24-bit packer 214 in the 24-bit mode, via multiplexers 231 and 233, which are controlled in response to a 24-bit mode control signal 235. In the 8- or 16-bit modes, the desktop data is supplied via the 8/16-bit packer while the video data is supplied via the YUV filter 213, with data flow again being controlled by the multiplexers 231 and 233.

To the viewer, the video data can be displayed such that it appears on the monitor on top of the desktop data and below the hardware cursor. In reality the video data is at the same level as the desktop data. This is because the desktop data and the video data are stored byte for byte next to each other in the shared frame buffer.

The ability to store desktop and video data next to each other in the shared frame buffer implies that 24-bit desktops can store 24-bit video pixels, 16-bit desktops can store 16-bit video pixels and 8-bit desktops can store 8-bit video pixels which, in part, is correct. 24-bit desktops typically use 24-bit or 4:4:4 video pixels. In this mode the video data can be stored in the frame buffer in a YUV; YUV format, where Y is the luma and U and V are the chroma. (U=chroma red and V=chroma blue). The 24-bit packer 214 of FIG. 5 is used for both desktop and video pixels where the video pixels are converted from the second format (e.g., the YUV format) to the first format (e.g., the RGB format) in converter 219 before being sent to the triple 8-bit DACs 230 via an RGB latch 218 (e.g., a stage used for synchronization of data supplied to the DACs). Those skilled in the art will appreciate that any number of such latches can be included throughout the architecture for timing and/or pipe equalization purposes.

16-bit desktops use 16-bit or 4:2:2 video pixels. In this mode data can be stored in the frame buffer in a UYVY; UYVY format as 32-bit UYVY packets. The 32-bit UYVY packets are defined as quads. Quads are 32-bit aligned in memory giving the 16-bit desktop mode a 2 pixel alignment resolution. In the FIG. 5 embodiment, the video data is converted by a YUV filter 213 from 16-bit 4:2:2 data into two 24-bit 4:4:4 pixels. This filter can, for example, be implemented in a manner described in copending U.S. application Ser. No. 08/552,774, Attorney Docket No. 024931-101, entitled, "YUV Video Backend Filter", filed of even date herewith, the contents of which are hereby incorporated by reference in their entirety. The 24-bit 4:4:4 pixels then flow through to the YUV to RGB converter 219 before being sent to the DACs 230.

8-bit desktops can also use 16-bit or 4:2:2 video pixels. In this mode, data can be stored in the frame buffer in a UYVY; UYVY format using 32-bit UYVY packets, or quads. As with the 16-bit desktop mode, quads are 32-bit aligned in memory giving the 8-bit desktop a 4 pixel alignment resolution. The backend YUV filter 213 can then be used to convert the 16-bit 4:2:2 data into four 24-bit 4:4:4 pixels. The 24-bit 4:4:4 pixels can be directed through the YUV to RGB converter 219 before being sent to the triple DACs 230. The backend filter creates four pixels for every quad in an 8-bit desktop mode. This is a two times multiplier since only two Y (i.e., luma) samples exist in each quad. A two or greater times zoom of the input video frame to the output video frame is actually mathematically equivalent in any desktop mode. Due to the two times multiplier in the video backend (when in 8-bit desktop mode), the software can be used to program the video frontend to scale to one-half the size it would normally in the X dimension. The pixel alignment resolutions are a restriction of the implementation not of the architecture. As with the 16-bit desktop mode, the filter 213 for the 8-bit desktop mode can be implemented in the manner described in co-pending U.S. application entitled "YUV Video Backend Filter" (incorporated by reference above).

Tag Map Usage in the Video Backend

As mentioned previously, the RGB desktop and YUV video data can reside byte for byte next to each other in the shared frame buffer. The video backend must therefore know what byte of data is currently supplied from the pixel FIFO 211 so that it can filter and/or YUV to RGB convert the data if necessary. To accomplish this, the video backend uses a small offscreen map referred to herein as a tag map, or tag memory 221, to identify each pixel type. In accordance with exemplary embodiments, at the start of each vertical blank, a tag map RAM base address is read in and used as the start address of the offscreen tag map. At the start of each horizontal blank (where the active pixels will be displayed), the tag map data needed for the next display scan line is read from the tag map memory into a tag line buffer 222. An output from the buffer 222 is supplied via a bit shifter 220 to a multiplexer 217, which can select between desktop and video data on a pixel-by-pixel basis, or on any other desired boundaries. The bit shifter 220 determines the number of bits per tag and the number of quads per tag, in response to register control.

In an exemplary implementation, the tag map "tags" quads. The quads are, via bit shifter 220, formed as 32-bit aligned 32-bit pixel data quantities. The video tag control register determines how many bits are used per tag. The video backend supports one or two bits per tag. One bit per tag works well for the one desktop plane and one video plane and allows the size of the tag map to be reduced. Of course, any number of bits per pixel can be stored in the tag map. Two bits per tag, for example, works well for one desktop plane and three video planes. The multiple video planes support overlapping video windows at the cost of increasing the size of the tag map. For example, 2 bits per tag can be used to support first and second video windows superposed with the graphics data on a display.

A video tag control register determines how many quads are used per tag. In exemplary embodiments, the video backend can support one, two, or three quads per tag. One quad per tag can, for example, be used for an 8-bit desktop mode and a 16-bit desktop mode. This setting gives four pixel alignment position resolution with an 8-bit desktop and a two pixel alignment position resolution with a 16-bit desktop. Two quads per tag can be used to give a four pixel alignment position resolution with a 16-bit desktop for modes where the size of the tag map needs to be decreased. Three quads per tag can be used for 24-bit desktop modes. Since the tag map identifies, or 'tags' quads (four byte quantities), and a 24-bit packed mode uses three bytes per pixel, some form of quad/pixel synchronization is needed. In 24-bit mode, every three quads, or 12 bytes, contains four 24-bit pixels. Thus, three quads per tag can be used, resulting in a four pixel alignment position resolution for 24-bit desktop modes. In this mode, each scan line starts with the first set of three quads, or four pixels, aligned to the left-hand edge.

The tag map mode is, in accordance with an exemplary embodiment, limited by two factors:

1. The size of the tag map (there must be enough offscreen memory to hold the tag map) and
2. The size of the tag line. In an exemplary embodiment, the video backend reads in the next line's tags during each horizontal blank. A set number, such as 64, bytes of tags can be read in at a time. In such an embodiment, a given tag map mode cannot use more than 64 bytes per display output scan line. In order to allow a tag map to fit, either the number of bits per tag must be reduced or the number of quads per tag must be increased. Those skilled in the art will appreciate that the number of bytes read in can be selected relative to the horizontal blank time in the foregoing embodiment. Those skilled in the art will further appreciate that the size of the tag line can be varied (e.g., increased) and still fit within the horizontal blank time. In alternate embodiments, the tag can be read in periodically from a memory, such as a tag first-in first-out (FIFO) memory. In this latter case, the tag map can be read in real time in a manner similar to that of the pixel FIFO 211.

When a YUV to RGB conversion is not required, the tag map need not be fetched, thereby saving memory bandwidth and chip power dissipation. This can, for example, be selected as the default mode when no video windows are present.

In an alternate embodiment of the invention, the tag map can be built differently for interlaced display modes. The same tag map image can be used for both even and odd frames of an interlaced display. This cuts the size of the tag map in half but also limits the pixel alignment position resolution to every other scan line in the Y dimension.

According to another aspect of an exemplary embodiment of the invention, the implementations of features such as pan and zoom requires that the video backend be configured such that the tag map matches what is currently being displayed on the monitor. That is, where a single address is used to synchronize the pixels of the display with corresponding information stored in the tag map, a mechanism must be provided to ensure that changes in relationships between the frame buffer and the display are retained between the frame buffer and the tag map. For the video frontend, the tag map matches what is on the current logical desktop, independent of what is actually being displayed. In most operating modes, the actual display and the logical desktop are identical since the current logical desktop is what is being displayed (e.g., usually the display is operated without the pan or zoom feature activated). Some enhanced display modes perform a pan and zoom function on a bigger logical desktop. These modes require two separate tag maps. One is for the video frontend which matches the logical desktop. This tag map never changes unless clipping area changes are requested. The second tag map is for the video backend which matches the portion the actual display and the logical desktop of the logical desktop that is currently displayed. This tag map needs to be updated whenever the pan position changes and whenever the video frontend's tag map changes. Separate tag map base addresses for the video frontend and backend can thus be supported. In alternate embodiments, a single tag map can be used in place of the first and second tag maps, provided the backend is consistent with the portion of the frame buffer currently being displayed.

Sometimes the video windows appear too dim or too bright relative to the surrounding desktop. The video backend can therefore also be configured to support separate video brightness adjustments. A video brightness control register 223 and an add/clip block 239 can be used to adjust the brightness (either up or down) of all video windows on the display independently from the brightness or the color depth of the desktop.

The Video Frontend

The video frontend receives video frames in various data formats from the host. It takes this raw data and formats it for the scaler. The scaler expands or crushes the image. The output of the scaler supports an optional clipping function so that irregular shaped, or overlapped video windows can be supported.

Figure 6:
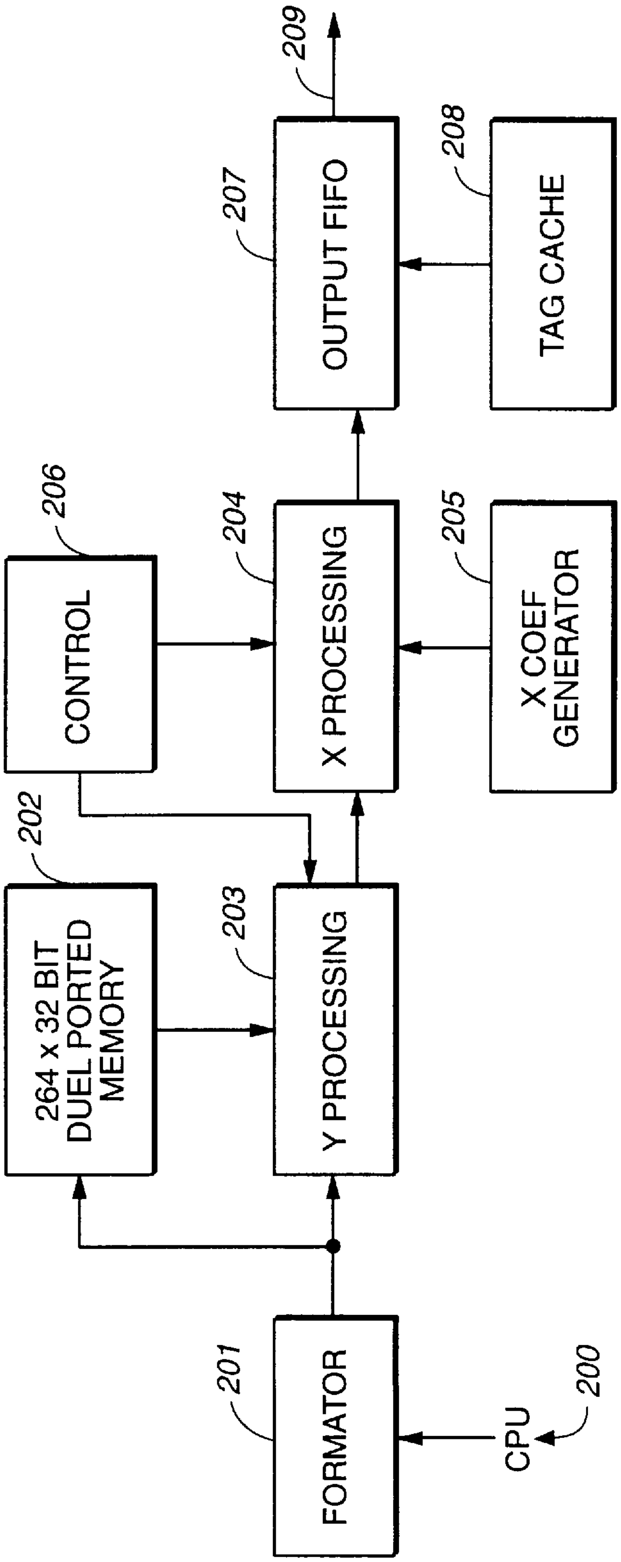
FIG. 6 illustrates an exemplary frontend architecture according to another embodiment of the invention.

FIG. 6 shows a more detailed illustration of an exemplary frontend architecture of the FIG. 4 split video architecture. Referring now to FIG. 6, the data flow of the video subsystem begins with a supply of video data from a central processing unit (CPU) 200 to the "formator" block 201. This block converts the incoming image into the proper format for the Y processing block 203. The data can be routed into the dual ported memory 202 or the Y processing block 203, or both. The Y processing block 203 scales the image vertically (i.e., either up or down) based, for example, on the CPU program scale factors and coefficients or on variables supplied from a control 206. Once the Y processor has produced a scaled data point, the data can be transferred to the X processing block 204. Since the processing of video data in the X and Y display axes is separable, the X processing block can separately scale the data in a horizontal direction based, for example, on variables supplied from the control 206. The X processing block 204 formats the resulting data into four byte quads for transfer into the video first-in first-out (FIFO) memory 207. The video FIFO memory 207, in conjunction with the tag map stored in a tag memory (e.g., cache) 208, then writes or clips the data into the frame buffer.

In alternate embodiments, the system can be configured to selectively eliminate fetching of the tag map by the frontend. For example, to save memory bandwidth, fetching of the tag map for frontend clipping can be eliminated when the video is on top and full size, (e.g., the full content of source video is displayed, without any information from the scaler being clipped). The indication used to disable fetching of the tag map by the frontend can, for example, be a single bit which, unless set, disables fetching of information stored in the tag memory 208.

The present invention has been described by way of example, and modifications and variations of the exemplary embodiments will be apparent to skilled artisans in this field without departing from the spirit of the invention. The preferred embodiments are merely illustrative and should not be considered restrictive in any way. The scope of the invention is to be measured by the appended claims, rather than the preceding description, and all variations and equivalents which fall within the range of the claims are intended to be embraced therein.

What is claimed is:

1. A split composite video architecture comprising:

a graphics input for supplying graphics data to a frame buffer;

a video input for supplying video data to the frame buffer;

format processing means for receiving the video data and scaling the video data for input into the frame buffer;

a tag map for mapping locations of the graphics data and video data stored in the frame buffer and for identifying video pixels stored in the frame buffer which are to be converted, tags of said tag map being loaded as portions of a horizontal blank in said frame buffer;

filter means for converting video data output from the frame buffer based on information stored in the tag map;

means for displaying the graphics data and the converted video data;

wherein each tag of said tag map further includes:

at least two bits per tag to support a display of a second video window at least partially in a first video window on said displaying means.

2. An apparatus for controlling the display of both graphics and video data comprising:

a graphics input for supplying graphics data in a first data format;

a video input for supplying video data in a second data format;

a memory for storing said graphics data in said first data format and for storing said video data in said second data format;

a tag map for identifying data output from said memory as graphics data of said first data format or as video data of said second data format; and wherein at least two bits per tag are stored in said tag map to support multiple video windows.

* * * * *